United States Patent
Robinson et al.

(10) Patent No.: US 8,371,940 B1
(45) Date of Patent: Feb. 12, 2013

(54) MULTI-PLAYER MUSIC GAME

(75) Inventors: Paul Robinson, Woodland Hills, CA (US); Dan Nelson, Woodland Hills, CA (US); Brian Bright, Woodland Hills, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 57 days.

(21) Appl. No.: 12/774,670

(22) Filed: May 5, 2010

(51) Int. Cl.
*A63F 9/24* (2006.01)
(52) U.S. Cl. .............. 463/39; 463/40; 84/611; 84/477 R
(58) Field of Classification Search .............. 463/39–40, 463/9; 84/611, 477 R
See application file for complete search history.

(56) References Cited

U.S. PATENT DOCUMENTS

| | | |
|---|---|---|
| 6,225,547 B1 | 5/2001 | Toyama et al. |
| 6,252,153 B1 | 6/2001 | Toyama |
| 6,353,174 B1 | 3/2002 | Schmidt et al. |
| 6,429,863 B1 | 8/2002 | LoPiccolo et al. |
| 6,482,087 B1 | 11/2002 | Egozy et al. |
| 6,905,413 B1 | 6/2005 | Terao et al. |
| 7,320,643 B1 | 1/2008 | Brosius et al. |
| 7,459,624 B2 * | 12/2008 | Schmidt et al. ............. 84/477 R |
| 7,625,284 B2 | 12/2009 | Kay et al. |
| 2011/0118032 A1 * | 5/2011 | Zalewski ....................... 463/39 |

OTHER PUBLICATIONS

Instruction Manual. "LIPS" (13 Pages). 2008.
Guitar Hero 5, Band Hero, and DJ Hero Announced. News from 1UP.com www.1up.com/do/newsStory?cld=3174098. Printed Apr. 29, 2010 (3 Pages).

* cited by examiner

*Primary Examiner* — Masud Ahmed
(74) *Attorney, Agent, or Firm* — Klein, O'Neill & Singh, LLP (57) ABSTRACT

A video game allows dynamic transitions in the number of players. A player may join other players already playing the game without interrupting the play of the existing players, and a player may cease playing the game without interrupting the play of players who continue playing. The video game uses a method including providing game play for at least one game player including displaying video information based on game program instructions and inputs from a controller. The method also includes determining whether a further player is joining the video game, and if the further player is joining the video game, displaying player specific information associated with the further player to the video information. The method also includes determining whether a player is quitting the video game, and if the player is quitting the video game, removing display of the player specific information associated with the player.

12 Claims, 7 Drawing Sheets

MULTI-PLAYER MUSIC GAME

BACKGROUND OF THE INVENTION

The present invention generally relates to video games and, more particularly, to a video games with multiple player capability.

Video games provide fun and enjoyment for many. Video games allow game players to participate in a variety of simulated activities, including those that the game players may not be able or desire to experience directly. Video games receive interactive inputs from users and may produce vibrant visual displays with accompanying audio.

Video games are often very elaborate in allowing players to identify or select details of game play characters, or identification of selection of other game play parameters. At times elaborate menus are provided by which game players may select game player characteristics, a particular game scenario, or a host of other items. Allowing game player selection of such items may enhance game play enjoyment. Unfortunately, provision of such menus may also impede ability of game players to quickly enjoy a game.

For example, music-based video games often provide an interactive experience allowing game players to simulate play of musical instruments, generally in accompaniment or interaction with prerecorded music, and such video games often include game controllers generally in the shape of musical instruments, providing heightened realism for music-based game play. Music-based video games may be played by groups of players. Group membership is generally static for the duration of the game. Adding or removing players may involve disrupting game play for all players.

BRIEF SUMMARY OF THE INVENTION

In various aspects the invention provides a method of providing for video game play, comprising: providing game play for at least one game player, including commanding presentation of a timed sequence of audio and video information for the at least one game player based on game program instructions and inputs from at least one controller associated with the at least one game player; determining whether a further player is joining the video game based on at least an input signal from a further controller during presentation of the timed sequence of audio and video information for the at least one game player; if the further player is joining the video game, providing game play for the at least one game player and the further player, including commanding presentation of a timed sequence of audio and video information for the at least one game player and the further player based on the game program instructions and inputs from the at least one controller and the further controller; determining whether a particular player is quitting the video game during presentation of the timed sequence of audio and video information for the at least one game player and the further player, the particular player being one of the at least one game player or the further player; and if the particular player is quitting the video game, commanding presentation of the timed sequence of audio and video information for the at least one game player and the further player without audio and video information for the particular player.

Another aspect of the invention provides a machine readable media for a video game, the machine readable media including program instructions for execution by at least one processor, the program instructions including program instructions for: commanding display of a first set of instructive cues; determining extent of compliance with the first set of instructive cues based on inputs received from a first game controller; determining receipt of an indication of a request from a second game controller to join the video game during display of the first set of instructive cues; commanding display of a second set of instructive cues while continuing command display of the first set of instructive cues; and determining extent of compliance with the second set of instructive cues based on inputs received from the second game controller.

These and other aspects of the invention are more fully comprehended upon review of this disclosure.

DETAILED DESCRIPTION

Figure 1A:
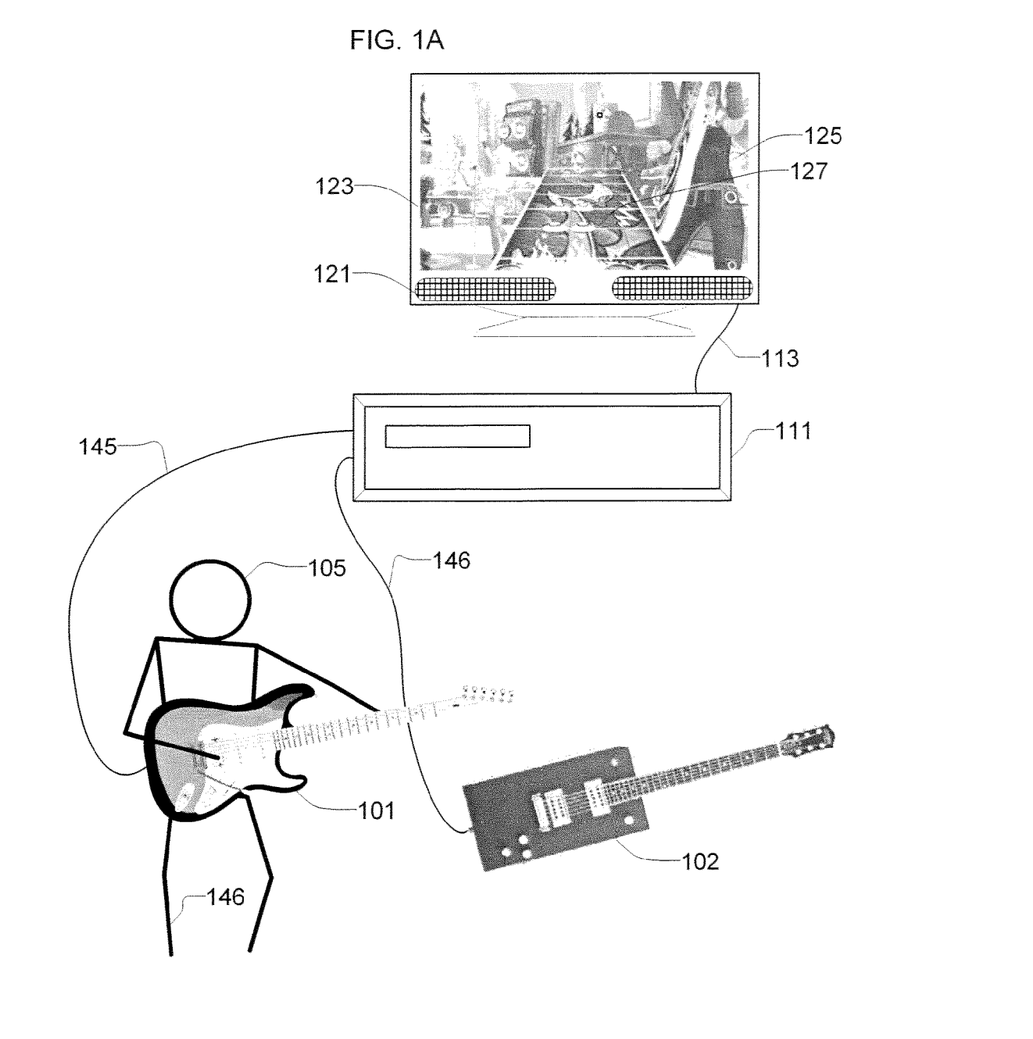
FIGS. 1A and 1B are examples of a video game system in accordance with aspects of the invention.
Figure 1B:
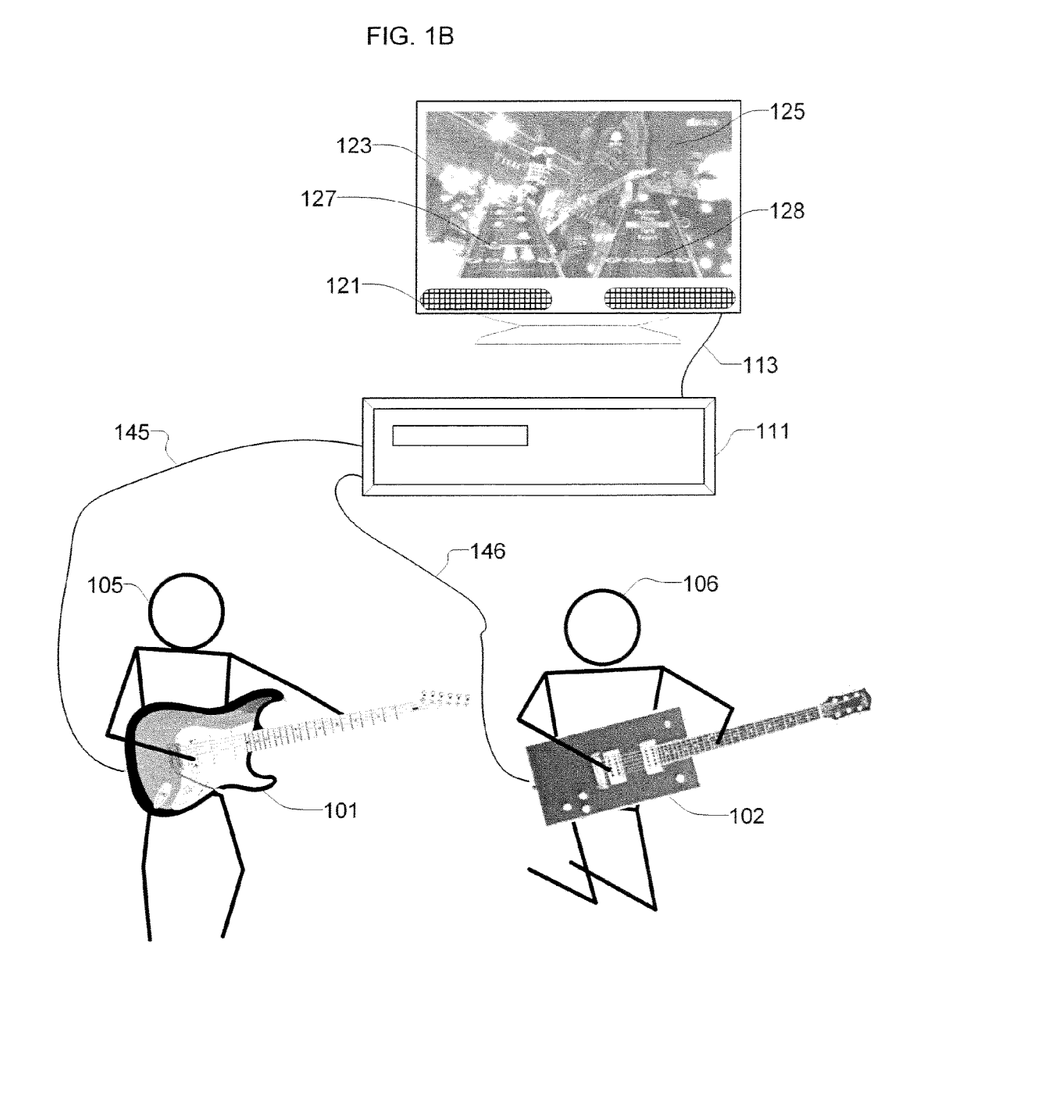

FIGS. 1A and 1B illustrate an example of a video game system in accordance with aspects of the invention. The video game system provides video-game play, and is able during video game play to dynamically change the number of players playing the video game. The video game system is illustrated in FIG. 1A being played by one player, a first player 105. The video game system is illustrated in FIG. 1B being played by two players, the first player 105 and a second player 106.

Embodiments of the present invention provide for in-game transition between the case illustrated in FIG. 1A, in which one player plays the game, and the case illustrated in FIG. 1B, in which two (or more) players play the game. As illustrated, the video game is a music video game, in which each player is provided instructive cues and is provided a score based on extent of compliance with the instructive cues, with in some embodiments a group score also being provided. In other embodiments the video game may be other types of games. In most embodiments video game play follows a linear progression, with for example a timed sequence of events for players to react to.

Each player controls actions in the game using controllers. A first controller 101 is used by the first player and a second controller 102 is used by the second player. As illustrated in FIGS. 1A and 1B, the game controllers are in the form of musical instruments. In other embodiments the game controllers may be in other forms, including game controllers commonly used in video game play, or even "virtual" game controllers in which a camera, for example, tracks player movements. The controllers include one or more input devices for the game players to signal game actions. Example input devices include buttons, switches, accelerometers, position sensors, and microphones. In some embodiments, as shown in FIG. 1A, the controller has a guitar shape and may include, for example, a strum bar and fret buttons as game player input devices.

A processing system 111, generally including a processor configured by game program instructions, determines game states and commands presentation of game video on a display 123 and game audio on associated speakers 121. The processing system, for example, may be a personal computer or game console with a processor, or multiple processors or processing cores, for executing program instructions providing for a game play. The instructions providing for game play and associated data are generally stored on removable media, for example, an optical disk. Accordingly, the processing system may include an optical drive, for example, a CD-ROM drive, a DVD drive, or Blu-ray drive, for reading the instructions and associated data. The program instructions include, variously in different embodiments, program instructions for processing inputs from the controllers, determining game states, and selection or generation of audio and video data for presentation. The processor generally changes game play sounds in response to inputs from the controllers.

The processing system includes circuitry for supplying audio and video signals to the display device 123. The display device is generally coupled to the processing system by an audio-video cable 113. The display device may also be coupled to the processing system wirelessly. Wireless coupling may use a wireless adapter at the display device, the processing system, or both. In some embodiments, the processing system is integrated with a device having a built-in display and built-in speakers.

The processing system includes circuitry for receiving the game players' inputs from the controllers. The processing system is coupled to the controllers by data links. The first controller is coupled to the processing system by a first data link 145; the second adapter is coupled to the processing system by a second data link 146. In some embodiments, the data links are universal serial bus (USB) cables, and the controllers and the processing system include USB interface circuitry. In some embodiments, the data links are wireless links, and the controllers and the processing system include wireless receivers, transmitters, or transceivers as appropriate.

In many embodiments, as illustrated in FIGS. 1A and 1B, the display device is a television that provides both visual and sound reproduction. In other embodiments, the audio and video signals are reproduced by separate devices. The display device 123 displays video images of game play, generally as commanded by the processor or other circuitry of the processing system. In the embodiment of FIG. 1A, the display device shows a screen shot of video game play with combined display of a music video 125 overlaid by a first instructive cue track 127 with portions highlighted according to actions by the first game player.

In the embodiment of FIG. 1B, the display device shows a screen shot of video game play with combined display of a music video 125 overlaid by a first instructive cue track 127 and a second instructive cue track 128. The first instructive cue track is associated with the first player; the second instructive cue track is associated with the second player. Other embodiments may have a greater number of players, for example, four players, and matching number of instructive cue tracks. Each instructive cue track includes instructive cues and, in some embodiments, status indicators for the associated player. When a player joins other players playing that were already playing the video game, an instructive cue track for the player is added while the other players continues their game play without disruption. Similarly, when a player leaves other players that continue playing the video game, the instructive cue track for the player is removed while the other players continue their game play without disruption. Embodiments of processes of players beginning or ending playing the video game are more specifically described below.

Figure 2:
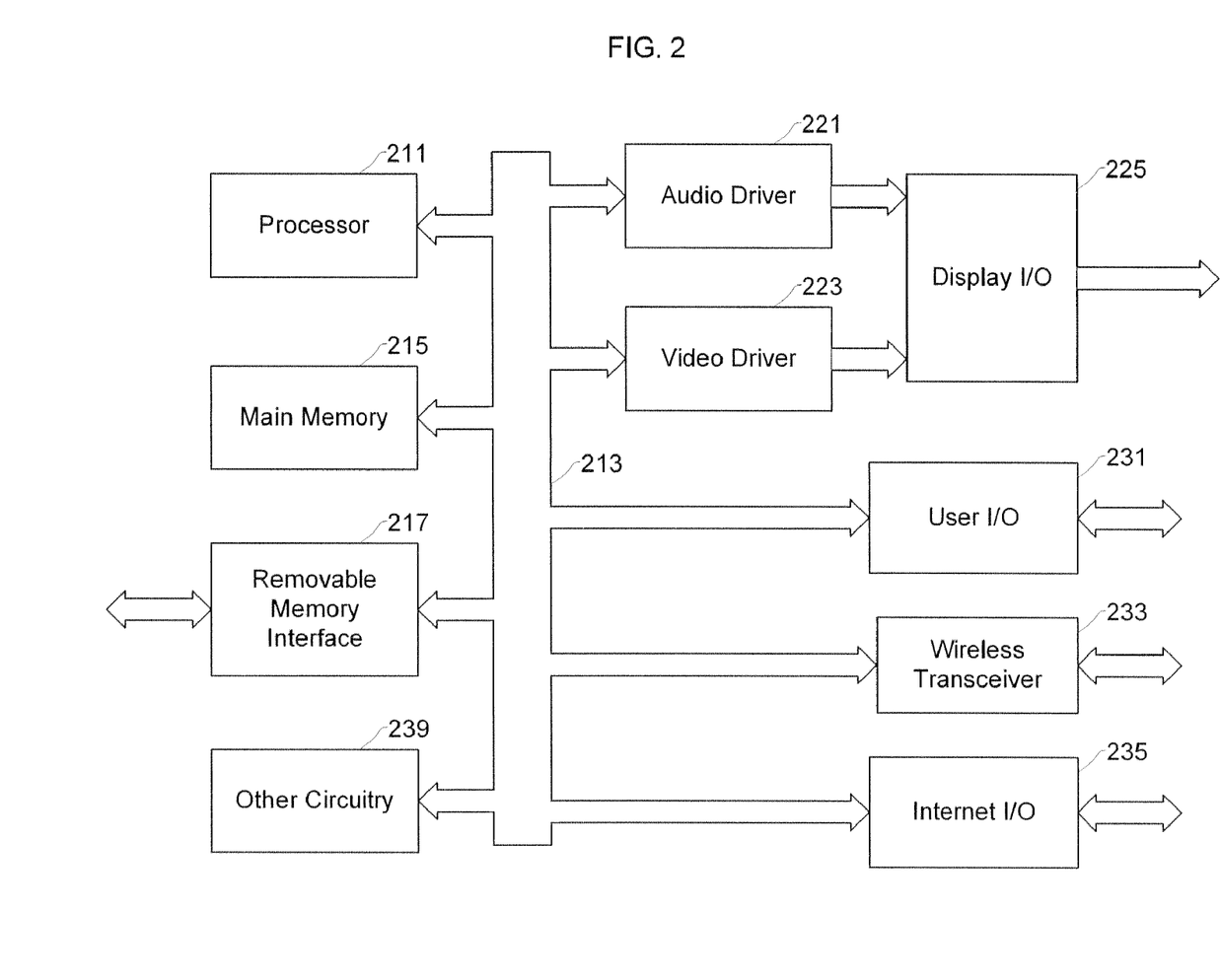
FIG. 2 is a block diagram of a processing system in accordance with aspects of the invention.

FIG. 2 is a block diagram of a processing system, for example, a personal computer or game console, useful in accordance with aspects of the invention. As shown in FIG. 2, a processor 211 is connected to other components via a bus 213. Other components include a main memory 215 and a removable memory interface 217 generally coupled to a removable memory device, for example, a DVD-ROM drive. The processor may execute instructions from the removable memory device to control game play and store game state information in the main memory. For example, the instructions may include video game instructions to facilitate video game play of, for example, the music based video game described with reference to FIGS. 1A-B.

The processor is coupled to an audio driver 221 and a video driver 223. The audio driver produces sound signals and the video driver produces image signals. The sound signals and image signals are transmitted from the processing system via a display I/O device 225. The display I/O device generally supplies the sound and image signals to a reproduction device or reproduction devices external to the processing system.

The processor may also be coupled to a user I/O device 231, a wireless transceiver 233, an Internet I/O device 235, and other circuitry 239. The user I/O device may receive signals from game controllers, with the controllers generally being used by game players and providing game player inputs, for example, during game play. Alternatively or additionally, the processing system may receive player inputs via the wireless transceiver. The Internet I/O device provides a communication channel that may be used, for example, for game updates.

Figure 3:
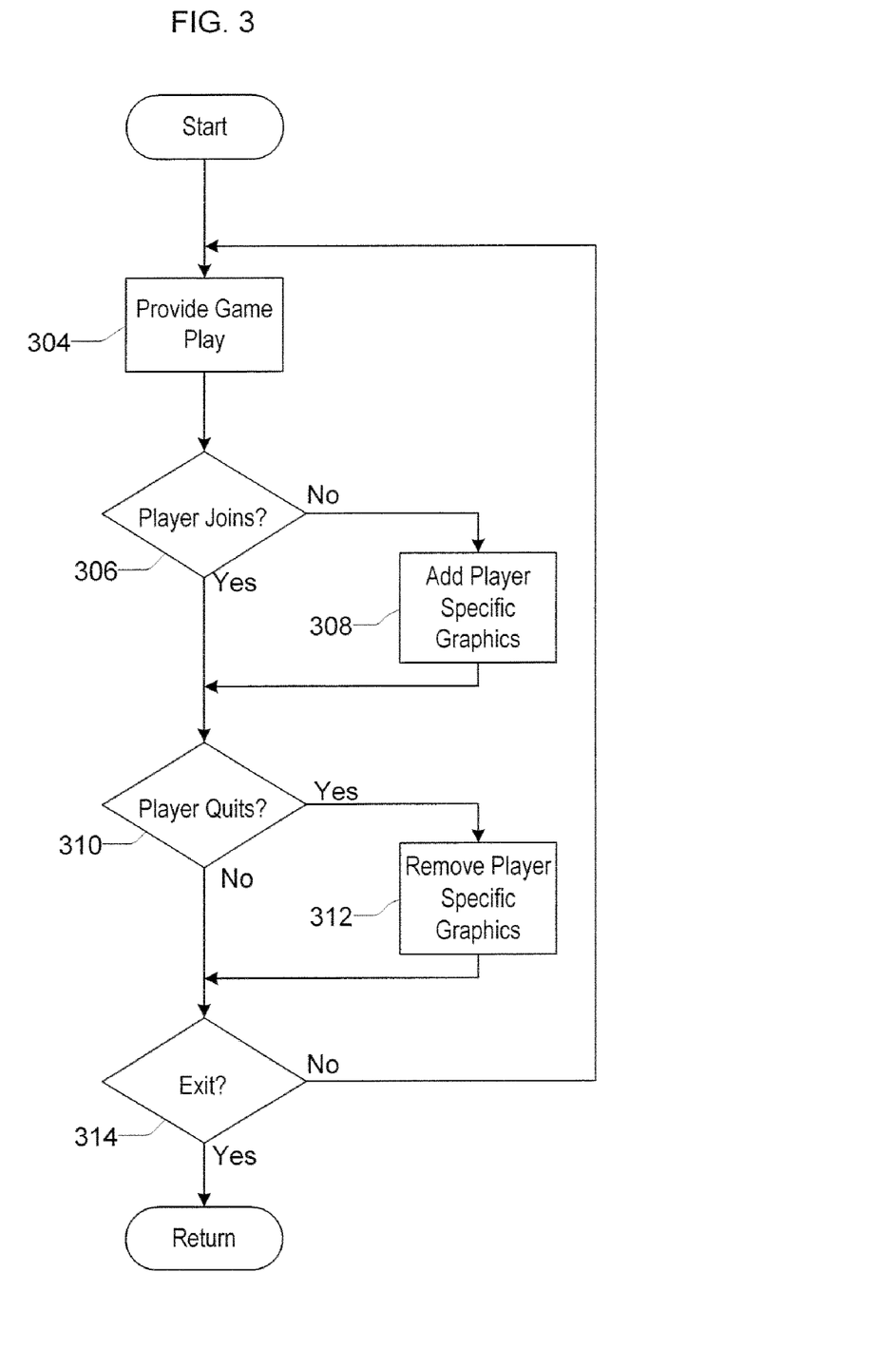
FIG. 3 is a flowchart of a process for a video game in accordance with aspects of the invention.

FIG. 3 is a flowchart of a process for a video game in accordance with aspects of the invention. In some embodiments, the process is performed by a processing system executing program instructions, for example, the system of FIG. 2. In some embodiments program instructions for performing the process, for example by the system of FIG. 2, are stored on a computer readable medium, for example in non-transitory media such as, in various embodiments, computer memory, CD-ROM, DVD, or flash drives. In some embodiments the video game is a music-based video game, for example one in which instructive cues are presented to a game player and a player is evaluated based on extent of compliance with the instruction cues, generally with musical accompaniment to the instructive cues or compliance with the instructive cues. The process may begin, for example, when a game player inserts a removable memory device into a game system, when a game system is turned on, or when a selection is made from a menu of the video game.

In block 304, the process provides game play. In most embodiments provision of game play is provided throughout the process of FIG. 3. The game play may command presentation of audio and video. The video may be images, which may be rendered by the processor or associated circuitry. The audio and/or video provides a sequence of events, which may repeat in some embodiments, for a game player or game players to respond to, and in many embodiments the sequence of events are a timed sequence of events. In some embodiments the sequence of events is a course of a racetrack or racecourse. In some embodiments the sequence of events is for a music-based game, and the sequence of events may be progression of play of a piece or song. For a music-based game the video may be of a band performing, a concert venue, or a dance floor. The band may include musicians whose roles the game players will perform. The audio includes multiple tracks, with the tracks associated with the various musicians or musical instruments in various embodiments. For example, if a game player is playing as a bass guitarist, one music track includes sounds of the bass guitar, and the other sounds of the song are included in one or more other music tracks. The game includes display of an instructive cue track for each game player. The instructive cue tracks may be displayed as overlays on portions of the video or rendered images. Each instructive cue track includes instructive cues, which may be termed gems, to provide the associated player with instructions of actions to perform on a controller, and a time to perform the actions. The process may use colors and positions of the gems to signal expected player actions. Likewise the process may alter the display of the gems to signal how well the player has performed, and determine a score for any active player. In one embodiment, the gems initially appear in an upper portion of a display screen and move generally toward a lower portion of the display screen. A horizontal NOW bar may be displayed in the lower portion of each instructive cue track with many player actions instructed to be performed when gems reach the NOW bar. The instructive cue track, or other portions of the display, may include a score indicator, a power meter, and other indications of game status.

In block 306, the process checks if a player has joined the video game. The process may determine that a player has joined the video game based on receiving a specific signal or sequence of signals from a controller or, in some embodiments, any signal from a controller not already associated with a game player currently playing the game. In some embodiments, the process determines that a player has joined the game based on receiving any signal from a controller not previous included in the video game. If a player has joined the video game, the process continues to block 308; otherwise, the process continues to block 310.

In block 308, the process adds audio and/or video information for the player joining the game. The video may be for example a lane for a vehicle to be driven, or in some embodiments a representation of a vehicle on a track or course. In a music-based game the video may be an instructive cue track for the player joining the game. Adding the video information may include repositioning video information for the other player(s). For example, in a music-based video game adding an instructive cue track may include repositioning instructive cue tracks associated with players who joined the video game previously. The process may also determine game options, such as a skill level, for the added player.

In block 310, the process checks if a player has selected to quit the video game. The process may determine that a player has selected to quit the video game based on receiving a specific signal on the controller used by the player. In some embodiments, the process determines that a player has selected to quit the game based on not receiving any signals over a predefined period of time from the controller used by the player. If a player has selected to quit the video game, the process continues to block 312; otherwise, the process continues to block 314.

In block 312, the process removes video associated with the quitting player from the video game. In addition, in many embodiments the process, as part of providing game play, ceases to evaluate player compliance with instructive cues, or determining changes to the quitting players score or changes to a group score based on the quitting player's lack of compliance with the instructive cues. For example, in a music-based video game the process may remove an instructive cue track for the quitting player from the video game. Removing the instructive cue track may include repositioning the instructive cue tracks associated with other players of the video game.

In block 314, the process checks if play of the video game should exit. The process may determine that it should exit based completion of a game sequence, for example, reaching the end of the song begun in block 302. The process may also determine that it should exit based on receiving an exit signal on a controller used by a sole active player. If the video game should exit, the process returns; otherwise, the process returns to block 304.

Figure 4:
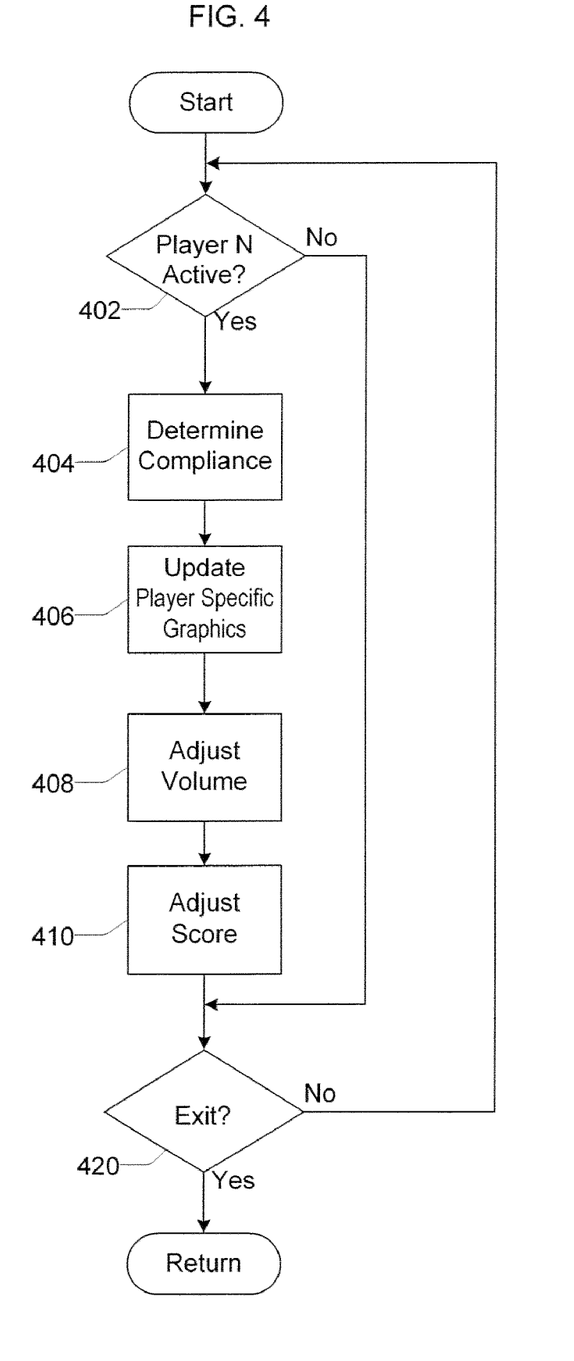
FIG. 4 is flowchart of a further process for video game play in accordance with aspects of the invention.

FIG. 4 is a flowchart of a further process for video game play in accordance with aspects of the invention. In some embodiments, the process is performed by a processing system executing program instructions, for example, the system of FIG. 2. In some embodiments program instructions for performing the process, for example by the system of FIG. 2, are stored on a computer readable medium, for example in non-transitory media such as, in various embodiments, computer memory, CD-ROM, DVD, or flash drives. The process may provide game play for another video game process, for example, the video game process illustrated in FIG. 3. In some embodiments, multiple video game play processes perform concurrently for each of multiple game players.

The process may be used, in some embodiments, for a music-based video game that includes presentation of audio, such as a piece or a song, and associated video, such as actual or rendered images of a band performing, or a concert venue. The band may include a musician whose role the game player will perform. In some embodiments the audio includes multiple tracks with one of the tracks being associated with the game player. For example, if the game player is playing the game as a bass guitarist, one music track includes sounds of the bass guitar and the other sounds of the song are included in one or more other music tracks. The game includes display of an instructive cue track for each game player. The instructive cue tracks are displayed, for example, as overlays on portions of the video. The instructive cue track includes instructive cues, or gems, to provide the player with instructions of actions to perform on a controller, for example, a guitar controller. Expected player actions may be based on colors and positions of the instructive cues. In one embodiment, the instructive cues initially appear in an upper portion of the instructive cue track and move generally toward a lower portion. A horizontal NOW bar may be displayed in the lower portion of the instructive cue track with many player actions instructed to be performed when instructive cues reach the NOW bar. The instructive cue track may include a score indicator, a power meter, and other indications of game player status. In some embodiments, multiple players may play the same role in the game. Accordingly, the players may share instructive cues.

In block 402, the process checks if a player is active. For example, the game may allow for M players, and the process may check if a player N is active, N ranging from 1 to M. The process may determine that the player is active based on receiving signals from a controller associated with player N, or receiving signals indicating a change in state of an input device of the controller. In some embodiments the process may determine that the player is active based on having received signals from the controller indicating a change in state of an input device of the controller within a predetermined period of time, for example in the immediately preceding five seconds. In some embodiments, whether a player is active is based on a status variable associated with the player. The status variable may have values indicating, for example, player joining, player active, player paused, player exiting, or player absent. If player N is active, the process continues to block 404; otherwise, the process continues to block 420.

In block 404, the process determines the player's compliance with expected or instructed performance. Compliance is generally determined using inputs from the player received from a game controller associated with the player. The inputs received are compared to actions corresponding to the instructive cues contained in the instructive cue track. For example, in an embodiment with instructive cues moving toward a NOW bar, when certain instructive cues or combinations of instructive cues reach the NOW bar, a corresponding player manipulation of the controller is considered correct. In a racing game embodiment, a player's compliance may be based on steering actions of a controller. Often, player compliance is based on the specific player manipulation of the controller and the timing of the player's actions.

In block 406, the process updates graphics associated with the player, for example the instructive cue track associated with instructive cue track N. The update may be based on the player's determined compliance from block 404 and progression of the game. The updated instructive cue track may indicate the player's compliance, for example, by changing a hue, an intensity, or a size of an instructive cue. Additionally or alternatively, the process may use sounds to signal the degree of compliance, for example playing a note or portion of a song or piece at a normal volume if there is compliance with an instructive cue, and muting or partially muting the note or portion of the song or piece if there is a failure to comply. The updated instructive cue track may also include added instructive cues instructing the player on future actions to perform on the controller. The new instructive cues may correspond to upcoming notes in the music. In some embodiments, any player action may be considered correct. In these "free play" embodiments, the instructive cue track is updated to indicate the player's actions, for example, by showing musical notes corresponding to the player's manipulation of the controller.

In block 408, which is optional in some embodiments, the process adjusts volume or otherwise changes audio associated with the player. For example, the process may adjust volume of a music track based on the compliance determined in block 404. Generally, the music track associated with player N is played with a higher volume when the player exhibits a relatively high level of compliance and at a lower volume when the player exhibits a relatively low level of compliance. When multiple players are playing the game as the same character, the process may pan the sound associated with the character toward the player with a higher compliance. Panning the sound may include changing an audio balance.

In block 410, the process adjusts the score for player N based on the compliance determined in block 404. In some embodiments the process may also update a group score based on the extent of compliance, with the group score reflecting the extent of compliance of all players for example. In some embodiments, the score is a team, or band, score for multiple game players. The band score may include nominal contributions for players who are not active. For example, when two game players are playing as a band in a game for three band members, the score may include a nominal contribution for the missing band member. In most embodiments the process also adjusts or commands adjustment to a displayed or presented score indicator(s).

In block 420, the process checks if the process should exit. Exiting may be based, for example, on whether the players are active in the game, on the elapsed time since the process started, on the player's completion or failure to complete a sequence tasks, or, in a music-based game, completion of a song in the presented audio. If the process should exit, the process returns; otherwise, the process returns to block 402.

The process may save information about the player, for example, the player's score and performance level, before returning.

Figure 5:
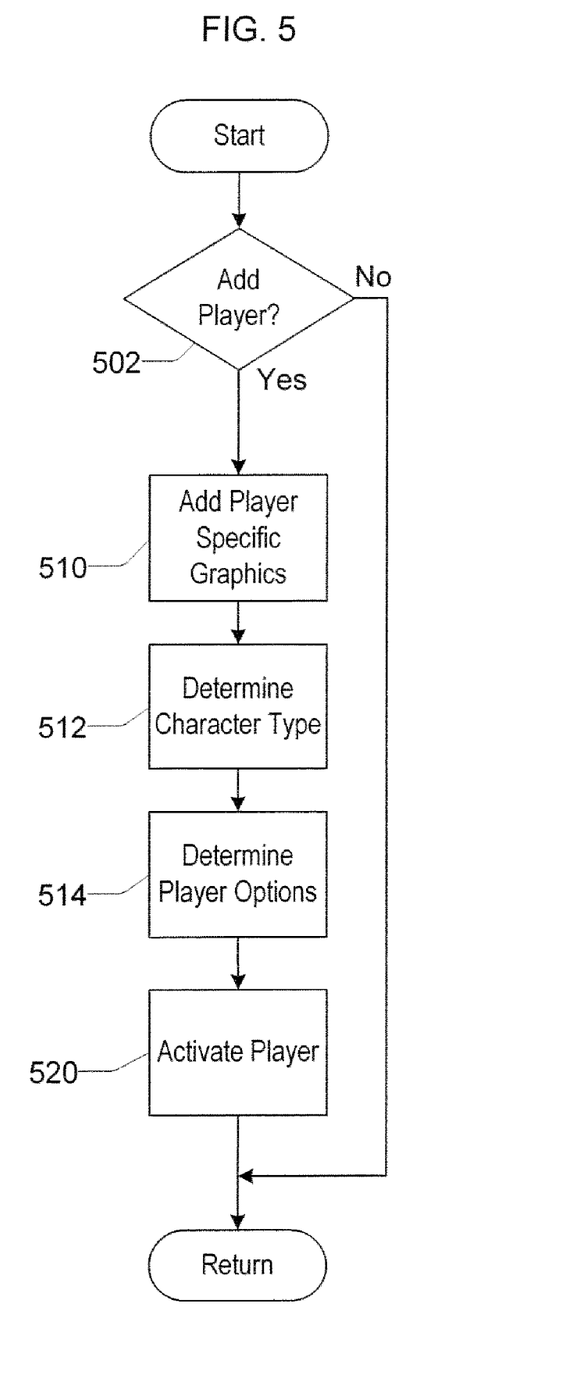
FIG. 5 is flowchart of a process for adding a player to a video game in accordance with aspects of the invention.

FIG. 5 is flowchart of an embodiment of a process for adding a player to a video game in accordance with aspects of the invention. In some embodiments, the process is performed by a processing system executing program instructions, for example, the system of FIG. 2. In some embodiments program instructions for performing the process, for example by the system of FIG. 2, are stored on a computer readable medium, for example in non-transitory media such as, in various embodiments, computer memory, CD-ROM. DVD, or flash drives. The process may provide players for an associated video game process, for example, the video game process illustrated in FIG. 3. The process may be used with a video game that includes display of an instructive cue track for each game player. Each instructive cue track includes indicators instructing actions for the associated player to perform and indications of how well the player has complied with the instructions. The instructive cue track may include a score indicator, a power meter, and other indications of player status.

In block 502, the process checks if a player is being added to the video game. The process may determine that a player is being added to the video game based on receiving a specific signal or sequence of signals from a controller or, in some embodiments, any signal from a controller not already associated with a game player currently playing the game. If a player is being added to the video game, the process continues to block 510; otherwise, the process returns.

In block 510, the process adds an instructive cue track associated with the added player. The instructive cue track includes information associated with the player. The instructive cue track is generally dynamic and is frequently updated during game play. In addition to adding the instructive cue track, the process may create an initial player state or add player information to a game state of an associated video game process. In some embodiments, the initial instructive cue track includes prompts for the player to select options for her game play. In addition to adding the instructive cue track for the added player, the process may reposition instructive cue tracks associated with other players.

In block 512, the process determines the type of character being player by the player being added. The type of character may be determined by reading identification or configuration information from the controller or by selection from a menu presented to the player. The type of character, in a music-based game, may include what type of instrument the character performs with.

In block 514, the process determines player options. The process may determine the options by presenting choice to the player within the instructive cue track for the player. The player may enter selection of choices by way of the controller. The options include choice such as difficulty level. In some embodiments, the options may include scoring methods, for example, whether the player is scored individually or as a member of a band.

In block 520, the process activates the added player in the game. In some embodiments, the process activates the player by setting a status variable in an associated video-game process. The process may provide a countdown to signal the player to begin active game play. When the player is activated in a game with other players, in some embodiments the activated player's score is initialized based on scores of the other players. For example, the score of the activated player may be set equal to highest score of the other players, the lowest score of the other players, or an average of the scores of the other players. Thereafter the process returns.

Figure 6:
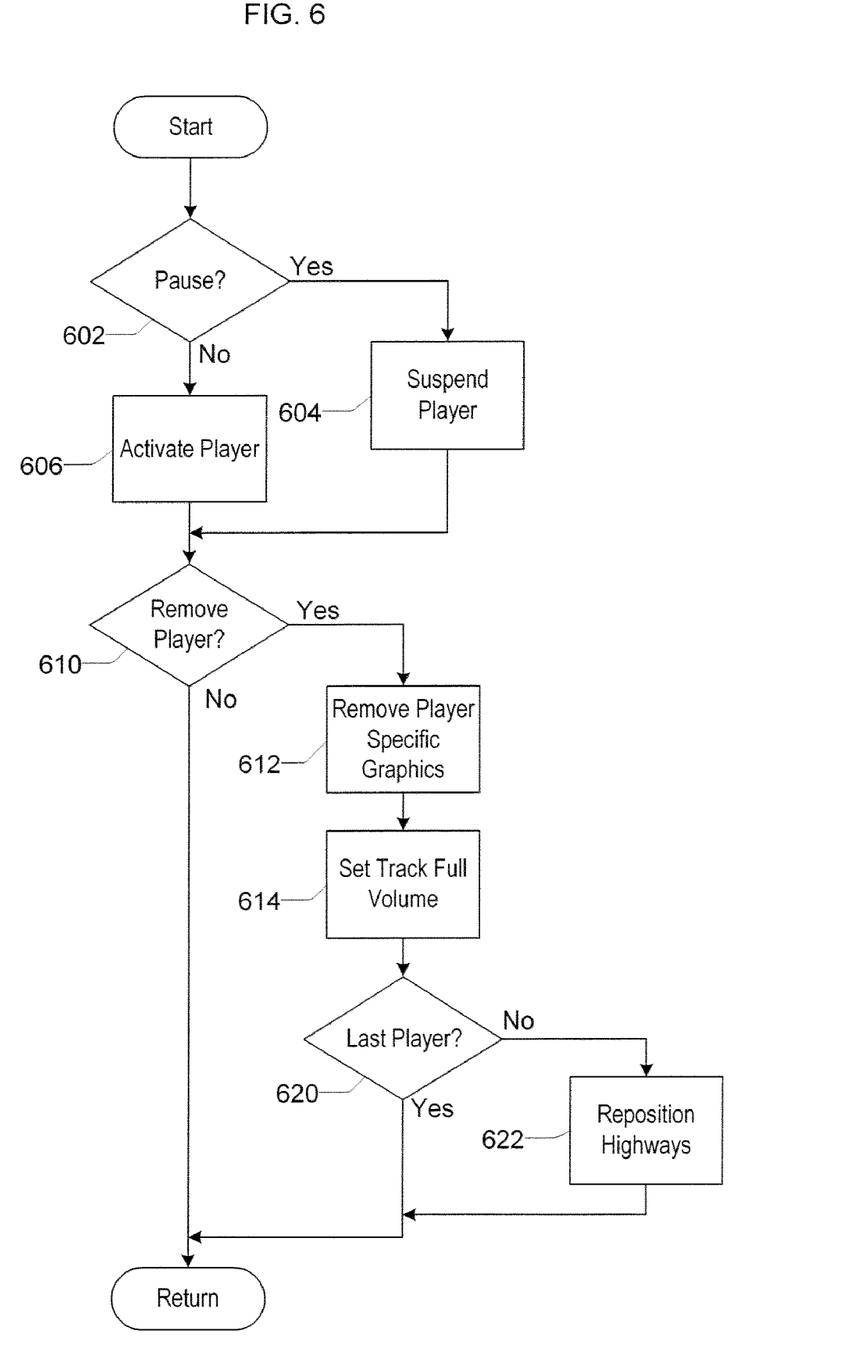
FIG. 6 is flowchart of a process for removing a player to a video game in accordance with aspects of the invention.

FIG. 6 is flowchart of a process for removing or suspending a player to a video game in accordance with aspects of the invention. In some embodiments, the process is performed by a processing system executing program instructions, for example, the system of FIG. 2. In some embodiments program instructions for performing the process, for example by the system of FIG. 2, are stored on a computer readable medium, for example in non-transitory media such as, in various embodiments, computer memory, CD-ROM, DVD, or flash drives. The process may remove players for an associated video-game process, for example, the video-game process illustrated in FIG. 3. The process may be used, in some embodiments, with a music-based video game that includes display of an instructive cue track for each game player. Each instructive cue track provides display for the associated player. The process may be performed repeated for each player playing the video game.

In block 602, the process checks if the player should be suspended from game play. Whether the player should be suspended may be determined based on inputs the player provides using a game controller. If the player should be suspended, the process continues to block 604; otherwise, the process continues to block 606.

In block 604, the process suspends the player from the game. In some embodiments, the process suspends the player by setting a status variable in an associated video-game process. The process may, in some embodiments, change game play options for the player while the player is suspended. For example, the player may change game characters or a difficulty level. Thereafter the process continues to block 610.

In block 606, the process activates the added player in the game. In some embodiments, the process activates the player by setting a status variable in an associated video-game process. In some instances, the player may already be active when the process performs block 606.

In block 610, the process checks if the player is to be removed from game. Whether the player is to be removed may be determined based on inputs the player provides using a game controller. The inputs may be selections from a menu of choices the process provides the player. If the player is exiting the game, the process continues to block 612; otherwise, the process returns.

In block 612, the process removes the instructive cue track associated with the exiting player from the video-game display. In some embodiments, the process removes the instructive cue track by setting game state information in an associated video-game process.

In block 614, the process sets the volume of the music track associated with the exiting player to full level. For example, if the player was playing as a drummer, the volume of the drum track is returned to a full or nominal level, whereas while the player was actively playing the video game, the volume of the drum track may have increased or decreased in response to compliance of the player with instructive cues. In some embodiments, the process sets the volume of the music track by setting game state information in an associated video-game process.

In block 620, the process checks if the player exiting the video game is the last player. The process may determine whether the player is the last player using information from the video game state indicating the number of players. If the player exiting the video game is the last player, the process returns; otherwise, the process continues to 622.

In block 622, the process repositions the instructive cue tracks for remaining players. In one embodiment, the process shifts the remaining instructive cue tracks so that they are spaced approximately evenly across the display screen. The process may additionally resize the remaining instructive cue tracks. For example, the process may make the instructive cue tracks wider. Thereafter the process returns.

Although the invention has been described with respect to certain specific embodiments, it should be recognized that the invention comprises the novel and unobvious claims supported by this disclosure, along with their insubstantial variations.

The invention claimed is:

1. A method of providing for video game play of a music-based video game, including in-game transitioning between one player playing the video game and two or more players playing the video game during a presentation of a music piece, the method comprising:
   providing game play for at least one game player, including commanding presentation of a timed sequence of audio and video information corresponding to the music piece for the at least one game player based on game program instructions and inputs from at least one controller associated with the at least one game player;
   determining whether a further player is joining the video game during the music piece based on at least an input signal from a further controller, the further controller not already associated with the at least one game player;
   if the further player is joining the video game during the music piece, providing game play for the at least one game player and the further player without disruption of the music piece, including commanding presentation of a timed sequence of audio and video information corresponding to the music piece for the at least one game player and the further player based on the game program instructions and inputs from the at least one controller and the further controller;
   determining whether a particular player is quitting the video game during the music piece, the particular player being one of the at least one game player or the further player; and
   if the particular player is quitting the video game during the music piece, commanding presentation of the timed sequence of audio and video information for the at least one game player and the further player without audio and video information for the particular player, and without disruption of the music piece.

2. The method of claim 1, further comprising, if the further player is joining the video game, determining a game character to be associated with the further player.

3. The method of claim 1, further comprising, if the further player is joining the video game: determining options for game play for the further player.

4. The method of claim 1, wherein commanding presentation of a timed sequence of audio and video information for the at least one player comprises:
   commanding display of instructive cues for operation of the at least one controller,
   commanding display of performance feedback based on compliance with the instructive cues based on inputs from the at least one controller.

5. The method of claim 4, further comprising adjusting a score for the at least one game player based on compliance with the instructive cues.

6. The method of claim 1, wherein commanding presentation of a timed sequence of audio and video information for the at least one player comprises:

adjusting volume of a music track associated with the at least one game player based on compliance with the instructive cues.

7. The method of claim 6, further comprising, if the particular player is quitting the video game, adjusting the volume of the music track associated with the particular player to a predetermined level.

8. Machine readable media for a music-based video game, the machine readable media including program instructions for execution by at least one processor, the program instructions including program instructions for:
   commanding display of a first set of instructive cues, the first set of instructive cues corresponding to a first track of a musical piece and providing instruction to a first player of actions to be performed via a first game controller;
   determining extent of compliance with the first set of instructive cues based on inputs received from the first game controller;
   determining receipt of an indication of a request from a second game controller to join the video game during display of the first set of instructive cues, the second game controller not already associated with a game player currently playing the video game, the indication of request including at least an input signal from the second game controller;
   commanding display of a second set of instructive cues while continuing to command display of the first set of instructive cues, the second set of instructive cues corresponding to a second track of the musical piece and providing instruction to a second player of actions to be performed via the second game controller; and
   determining extent of compliance with the second set of instructive cues based on inputs received from the second game controller.

9. The machine readable media of claim 8, wherein the program instructions further include program instructions for:
   commanding presentation of audio for a portion of the musical piece for compliance with each instructive cue of the first set of instructive cues;
   commanding presentation of audio for another portion of the musical piece for compliance with instructive cue of the second set of instructive cues.

10. The machine readable media of claim 9, wherein the portion of the musical piece is a portion of the musical piece for a first musical instrument, and the other portion of the musical piece is a portion of the musical piece for a second musical instrument.

11. The machine readable media of claim 8, wherein the program instructions further include program instructions for:
   determining receipt of an indication from the second game controller to leave the video game during display of the second set of instructive cues; and
   ceasing determining extent of compliance with the second set of instructive cues while continuing to determine extent of compliance with the first set of instructive cues.

12. The machine readable media of claim 11, wherein the program instructions further include program instructions for:
   ceasing commanding display of the second set of instructive cues while continuing to command display of the first set of instructive cues.

* * * * *